(12) United States Patent
Ogata

(10) Patent No.: US 11,704,080 B2
(45) Date of Patent: Jul. 18, 2023

(54) INSTALLATION METHOD AND NON-TRANSITORY COMPUTER-READABLE STORAGE MEDIUM

(71) Applicant: SHARP KABUSHIKI KAISHA, Sakai (JP)

(72) Inventor: Yoshitaka Ogata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/670,754

(22) Filed: Feb. 14, 2022

(65) Prior Publication Data

US 2022/0291880 A1 Sep. 15, 2022

(30) Foreign Application Priority Data

Mar. 11, 2021 (JP) ................................ 2021-039092

(51) Int. Cl.
*G06F 3/12* (2006.01)
(52) U.S. Cl.
CPC .......... *G06F 3/1225* (2013.01); *G06F 3/1204* (2013.01); *G06F 3/1273* (2013.01)

(58) Field of Classification Search
None
See application file for complete search history.

(56) References Cited

U.S. PATENT DOCUMENTS

| 2018/0143794 A1* | 5/2018 | Kobayashi | G06F 3/1205 |
| 2018/0146110 A1* | 5/2018 | Kitagawa | G06F 3/1204 |
| 2018/0253265 A1* | 9/2018 | Mitsui | G06F 3/1288 |

FOREIGN PATENT DOCUMENTS

JP 2014-026621 A 2/2014

\* cited by examiner

*Primary Examiner* — Frantz Bataille
(74) *Attorney, Agent, or Firm* — ScienBiziP, P.C.

(57) ABSTRACT

An installation method includes installing a universal printer driver for an image forming apparatus in a user terminal for use by a user; determining whether or not there is installed a dedicated printer driver in the user terminal; and upon determining that there is installed a dedicated printer driver in the user terminal, performing a presentation process of presenting to the user a function that will no longer be available for use if the dedicated printer driver is uninstalled.

10 Claims, 11 Drawing Sheets

FIG.4

| SETTING FILE FOR UPD | SETTING FILE FOR FIRST DPD | SETTING FILE FOR SECOND DPD |
|---|---|---|
| ... Support_Double-sided=1 Support_N-up=1 Support_Staple=0 Support_Punch=0 Support_Trimmer=0 ... | ... Support_Double-sided=1 Support_N-up=1 Support_Staple=1 Support_Punch=1 Support_Trimmer=1 ... | ... Support_Double-sided=1 Support_N-up=1 Support_Staple=1 Support_Punch=1 Support_Trimmer=0 ... |

FIG.7

LOG DATA STORED IN IMAGE-FORMING PROCESS

| PRINT TIME AND DAY | SENDER DEVICE | PRINT FILE NAME | ... | Double-sided | N-up | Staple | Punch | Trimmer | ... |
|---|---|---|---|---|---|---|---|---|---|
| t11 | PC1 | aaaa.pdf | ... | 1 | 0 | 1 | 0 | 0 | ... |
| t12 | PC2 | bbbb.doc | ... | 1 | 1 | 0 | 1 | 0 | ... |
| t13 | PC1 | cccc.doc | ... | 0 | 0 | 0 | 0 | 0 | ... |
| t14 | PC1 | dddd.pdf | ... | 1 | 0 | 0 | 1 | 0 | ... |

FIG.10

LOG DATA FOR FIRST DPD

| PRINT TIME AND DAY | THE IMAGE FORMING APPARATUS (SENDER) | PRINT FILE NAME | ... | Double-sided | N-up | Staple | Punch | Trimmer | ... |
|---|---|---|---|---|---|---|---|---|---|
| t21 | MFP1 | eeee.doc | ... | 0 | 0 | 0 | 1 | 0 | ... |
| t22 | MFP1 | ffff.pdf | ... | 1 | 0 | 0 | 1 | 0 | ... |
| t23 | MFP1 | gggg.tiff | ... | 0 | 1 | 0 | 0 | 1 | ... |

FIG.11

| Driver Installation                              ✕ |
|---|
| Are you sure you want to uninstall Dedicated Driver MX-XXXX? |
| Attention: These functions will no longer be available. Staple Punch Trimmer |
| [YES(Y)]   [NO(N)] |

| Driver Installation                              ✕ |
|---|
| Are you sure you want to uninstall Dedicated Driver MX-YYYY? |
| Attention: These functions will no longer be available. Staple Punch |
| [YES(Y)]   [NO(N)] |

INSTALLATION METHOD AND NON-TRANSITORY COMPUTER-READABLE STORAGE MEDIUM

CROSS-REFERENCE TO RELATED APPLICATION

The present application claims priority from Japanese Application JP2021-039092, the content of which is hereby incorporated by reference into this application.

BACKGROUND OF THE INVENTION

1. Field of the Invention

The present invention relates to installation methods and information storage mediums.

2. Description of the Related Art

There are two types of printer drivers: dedicated printer drivers (hereinafter, "DPD") and universal printer drivers (hereinafter, "UPD").

A single UPD is advantageously compatible with different models of the image forming apparatus because the UPD supports general functions of the image forming apparatuses. For instance, Japanese Unexamined Patent Application Publication, Tokukai, No. 2014-026621 discloses a technique of installing a UPD under given conditions to reduce the number of times the DPD is installed.

SUMMARY OF THE INVENTION

Japanese Unexamined Patent Application Publication, Tokukai, No. 2014-026621 disclosure a technique of uninstalling the DPD after installing the UPD. The UPD however does not support model-specific functions. The uninstallation of the DPD therefore may disable some of the functions of the image forming apparatus to which the DPD will be connected. If, for example, the user wants to use such a function, the DPD needs to be installed again.

The present disclosure, in some aspects thereof, can provide, for example, a highly convenient installation method and a highly convenient information storage medium.

Solution to the Problems

The present disclosure, in an aspect thereof, is directed to an installation method including: installing a universal printer driver for an image forming apparatus in a user terminal for use by a user; determining whether or not there is installed a dedicated printer driver in the user terminal; and upon determining that there is installed a dedicated printer driver in the user terminal, performing a presentation process of presenting to the user a function that will no longer be available for use if the dedicated printer driver is uninstalled.

The present disclosure, in another aspect thereof, is directed to an information storage medium containing an installation program for a universal printer driver for an image forming apparatus, the installation program causing a computer to operate as: an installation unit that installs the universal printer driver in a user terminal for use by a user; a determining unit that determines whether or not there is installed a dedicated printer driver in the user terminal; and a presentation unit that, upon the determining unit determining that there is installed a dedicated printer driver in the user terminal, performs a presentation process of presenting to the user a function that will no longer be available for use if the dedicated printer driver is uninstalled.

BRIEF DESCRIPTION OF DRAWINGS

FIG. 4 shows exemplary setting files.

FIG. 7 shows exemplary log data for image-forming jobs.

FIG. 10 shows exemplary log data for image-forming jobs.

FIG. 11 shows an example of a presented screen.

DETAILED DESCRIPTION OF THE INVENTION

Figure 1:
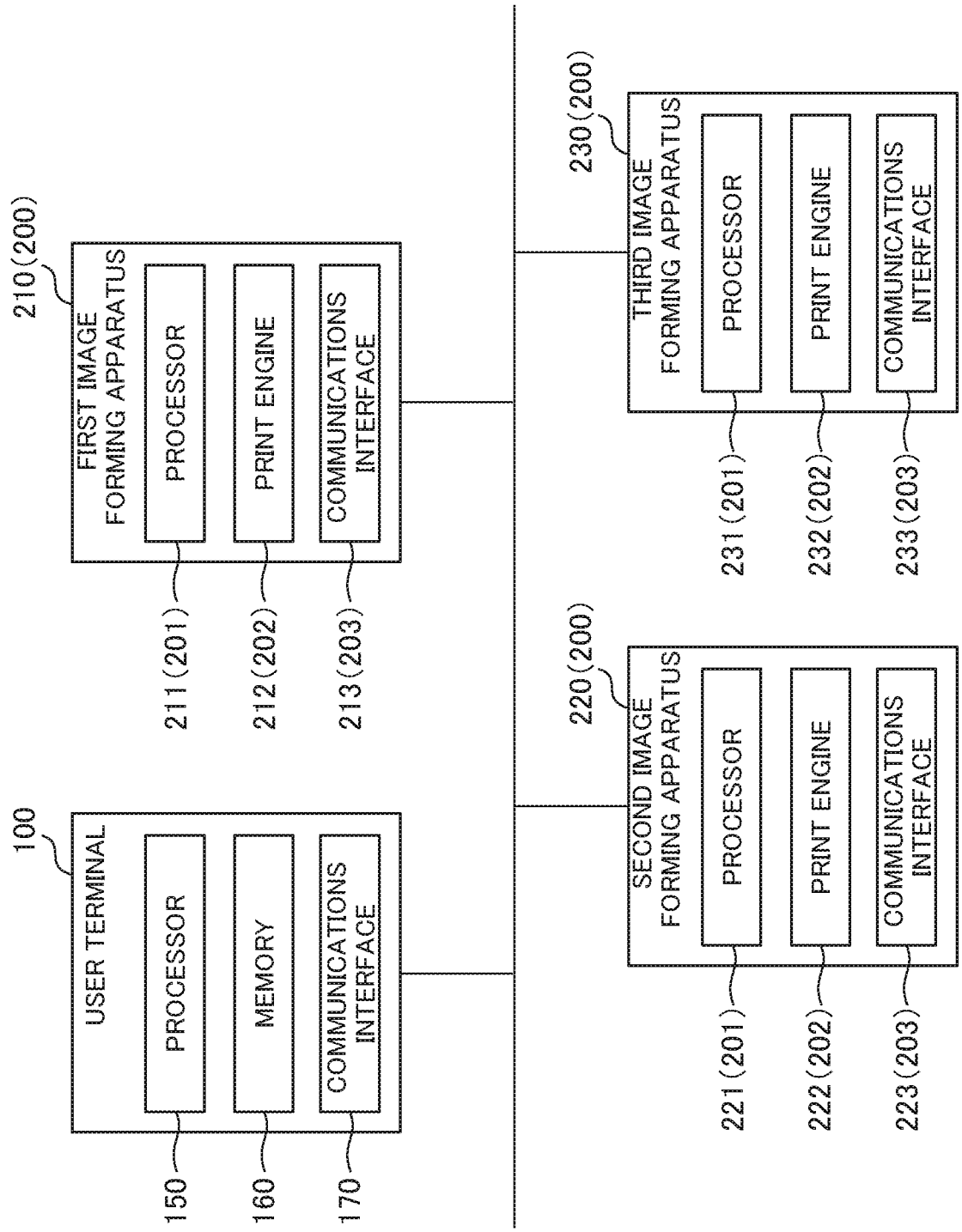
FIG. 1 illustrates an exemplary hardware configuration of a user terminal and image forming apparatuses.

The following will describe the present embodiment with reference to drawings. Identical and equivalent elements in the drawings are denoted by the same reference numerals, and description thereof is not repeated. The scope of the present invention is not unreasonably limited by the present embodiment described below. Not all the members described in the present embodiment are essential to the present disclosure.

1. Exemplary System Configuration

FIG. 1 is a diagram illustrating an exemplary system configuration to which the technique in accordance with the present embodiment is applied. Referring to FIG. 1, a system in accordance with the present embodiment includes a user terminal 100 and image forming apparatuses 200. FIG. 1 shows a first image forming apparatus 210, a second image forming apparatus 220 and a third image forming apparatus 230 as the image forming apparatuses 200. This example does not limit the number of image forming apparatuses 200 that can be connected to the user terminal 100. Although the following description assumes, as an example, that the first image forming apparatus 210, the second image forming apparatus 220, and the third image forming apparatus 230 are all different models of the image forming apparatus 200, some of these image foaming apparatuses 200 may be of the same model.

The user terminal 100 is a terminal device used by a user. The user terminal 100 is, for example, a PC (personal computer). The user terminal 100 in accordance with the present embodiment is capable of giving print instructions to the image forming apparatus 200 via a printer driver. The user terminal 100 does not need to be a PC and may be, for example, a smartphone, a tablet, a wearable, or a like apparatus.

Referring to FIG. 1, the user terminal 100 includes a processor 150, a memory 160, and a communications interface 170. Alternatively, the user terminal 100 may have a different hardware configuration. The hardware configuration may be varied in form: for example, some of these components may be omitted, and/or other components may be added. The user terminal 100 may include, for example, a display device that corresponds to a display unit 140 (detailed later with reference to FIG. 2).

The processor 150 may be any appropriate type of processor including a CPU (central processing unit), a GPU (graphics processing unit), a DSP (digital signal processor), or an ASIC (application specific integrated circuit). The processor 150 may include a peripheral as well as, for example, a CPU, a GPU, or a DSP. The peripheral may be an IC (integrated circuit) and may include, for example, resistors and capacitors.

The memory 160 may be: a semiconductor memory such as an SRAM (static random access memory), a DRAM (dynamic random access memory), an ROM (read-only memory), or a flash memory; a register; a magnetic storage device such as a hard disk drive (HDD); or an optical storage device such as an optical disc device.

The communications interface 170 provides an interface for external communications. For instance, the communications interface 170 is an interface for communications over a network and includes an antenna, an RF (radio frequency) circuit, and a baseband circuit. The communications interface 170 may operate under the control of the processor 150 and may include s communications control processor other than the processor 150, The communications interface 170 is an interface for communications in compliance with, for example, IEEE 802.11. However, the specific communications scheme may vary. For instance, the communications interface 170 may be an interface for wired communications, for example, to perform communications in compliance with the USB (universal serial bus) standards.

The image forming apparatus 200 has a printing function. The image forming apparatus 200 may be a printer, a printer with a scan function, or a multifunction printer or peripheral (MFP) having various functions including a printing function. The image forming apparatuses 200 here include, for example, the first image forming apparatus 210, the second image forming apparatus 220, and the third image forming apparatus 230 as described earlier.

Each image forming apparatus 200 includes a processor 201, a print engine 202, and a communications interface 203. The print engine 202 is, for example, an equivalent of a print engine 212 of the first image forming apparatus 210, a print engine 222 of the second image forming apparatus 220, and a print engine 232 of the third image forming apparatus 230, all shown in FIG. 1. The print engine 202 may take various concrete forms in applications as described in the following. The print engine 202 may have the configuration of any of the print engine 212, the print engine 222, and the print engine 232, which may either share the same configuration or have different configurations.

Likewise, the communications interface 203 is, for example, an equivalent of a communications interface 213, a communications interface 223, and a communications interface 233 shown in FIG. 1. The communications interface 213, the communications interface 223, and the communications interface 233 may either share the same configuration or have different configurations. The processor 201 is an equivalent of a processor 211, a processor 221, and a processor 231 shown in, for example, FIG. 1. The processor 211, the processor 221, and the processor 231 may either share the same configuration or have different configurations.

The print engine 202 includes a mechanical structure to print on a print medium. As an example, the print engine 202 includes: transport rollers for transporting a print medium in a transport direction; and a transport motor for driving the transport rollers. When the image forming apparatus 200 is an inkjet printer, the print engine 202 includes: a carriage for carrying a print head; and a carriage motor for driving the carriage in a main scan direction that is perpendicular to the transport direction. The print engine 202 causes the print head reciprocating in the main scan direction to eject ink while transporting the print medium in the transport direction, to form an image on the print medium. The print engine 202 however does not necessarily have this configuration because the image forming apparatus 200 in accordance with the present embodiment may be any appropriate type of image forming apparatus. The image forming apparatus 200 may be, for example, an inkjet printer of a linear head type that includes a print head having a width that matches the width of the print medium. Alternatively, the image forming apparatus 200 may be an electrophotographic image forming apparatus such as a laser printer.

The communications interface 203 communicates with the user terminal 100. The communications interface 203 may communicate under, for example, the USB standards, the IEEE 802.11 standards, or any other scheme or standard. The communications interface 203 acquires an image-forming job from the user terminal 100. An image-forming job is, specifically, a print job and as will be described later in detail, a set of data used by the image forming apparatus 200 in printing.

The processor 201 controls the print engine 202 to print in accordance with the image-forming job. The processor 201 may be a CPU, a DSP, or any other processor. The processor 201 may alternatively be a combination of a main CPU for controlling the overall operation of image forming apparatus 200 and a sub-CPU for print control.

The image forming apparatus 200 may have a configuration that realizes model-specific functions. The first image forming apparatus 210 may include the entire configuration described below, a part of the configuration, or none of the configuration. The first image forming apparatus 210 may include a model-specific configuration other than the following configuration. The same description applies to the second image forming apparatus 220 and the third image forming apparatus 230. The first image forming apparatus 210 and the second image forming apparatus 220 include at least a part of the configuration described below in the example detailed later with reference to, for example, FIG. 4.

As an example, the image forming apparatus 200 may include a finisher including a staple unit. The finisher aligns the print media on which images have been formed and staples the print media together using the staple unit. This function of stapling will be referred to as the stapler function throughout the following description.

The image forming apparatus 200 may alternatively include a finisher with a punching unit. This finisher aligns the print media on which images have been formed and opens a prescribed number of punch holes at prescribed intervals using the punching unit. The opened punch holes facilitate the binding of the print media. This function of opening punch holes will be referred to as the punching function throughout the following description.

The image forming apparatus 200 may include a trimmer. The trimmer includes a cutter for cutting, for example, the print medium on which an image has been formed. The trimmer here may cut the print medium in the main scan direction, in the transport direction, or both in the main scan direction and in the transport direction. For instance, the trimmer can cut out a prescribed area of the image formed on, for example, a print medium such as a roll of paper, to readily provide a print result of a desirable size and shape. This function of cutting the print medium using the trimmer will be referred to as the trimmer function throughout the following description.

The stapler function, the punching function, the trimmer function are performed by, for example, dedicated hardware. Some models of the image forming apparatus 200 therefore may not provide these functions.

Figure 2:
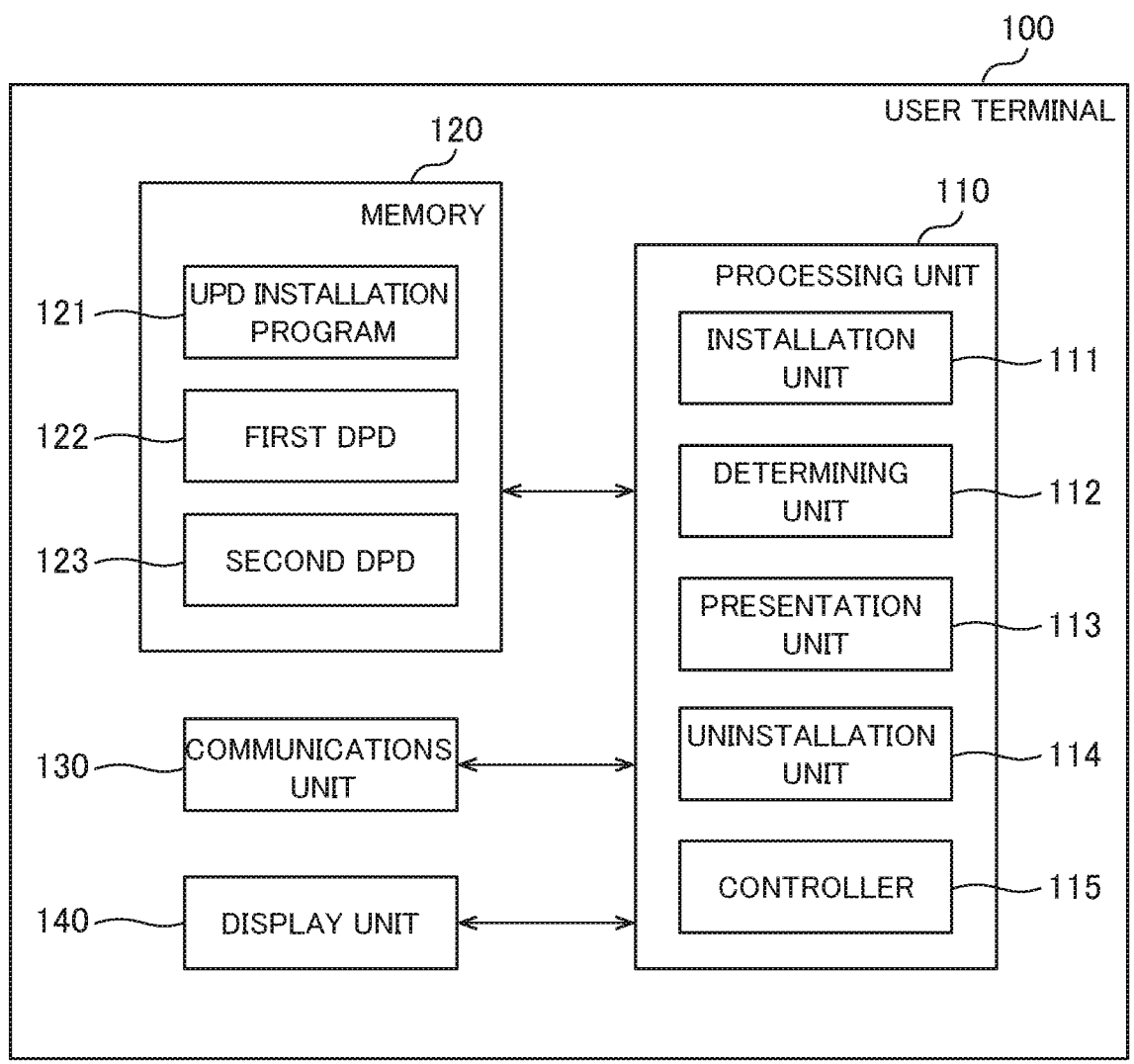
FIG. 2 is a functional block diagram of a user terminal.

FIG. 2 is a diagram of exemplary functional blocks for the user terminal 100. The user terminal 100 includes a processing unit 110, a memory 120, a communications unit 130, and the display unit 140. The processing unit 110 is an equivalent of the processor 150 shown in FIG. 1. The memory 120 is an equivalent of the memory 160 shown in FIG. 1. The communications unit 130 is an equivalent of the communications interface 170 shown in FIG. 1. The user terminal 100 is not necessarily configured as shown in FIG. 2. The user terminal 100 may include an additional configuration, lack a part of the configuration, or otherwise vary.

The processing unit 110 may include an installation unit 111, a determining unit 112, a presentation unit 113, an uninstallation unit 114, and a controller 115. The memory 120 may store a UPD installation program 121, a first DPD 122, and a second DPD 123.

A description is given now of the UPD and the DPD. The image forming apparatus 200 may have various functions including a double-sided printing function, an N-up printing function, a stapler function, a punching function, and a trimmer function. The double-sided printing function forms an image on both sides of the print medium. The N-up printing function prints N pages of image data on one print medium, where N is a numerical value larger than or equal to 2 such as 2, 4, and 8. The N-up printing function may be termed the N-on-one printing function.

Dedicated control programs and hardware are needed to realize these functions. Therefore, some of the functions may be available, and others may not be available, on the image forming apparatus 200 depending on the model. For instance, the double-sided printing function and the N-up printing function are frequently used and generally available on many models. On the other hand, the stapler function may only be available on some models that include dedicated hardware.

A UPD supports functions generally available on many models. For instance, the UPD supports the double-sided printing function and the N-up printing function, but does not support, for example, the stapler function. When the user wants to print using the functions supported by the UPD, the user can print in a normal manner because the image forming apparatus 200 is likely to have those functions. A single UPD is therefore compatible with various models of the image forming apparatus 200, so that the user can switch between the image forming apparatuses 200 for output every time a print is made.

In contrast, a DPD supports more functions than a UPD including model-specific functions. For instance, the DPD supports, for example, the stapler function, the punching function, and the trimmer function, which are only available on limited models. The DPD, designed in this manner, enables the functions not supported by the UPD. The stapler function, as an example, may not be available on some models of the image forming apparatus 200 because the models include no hardware to provide the stapler function. Even when a DPD for a given model is installed on another model, the user may therefore fail to print using the function supported by the DPD because the image forming apparatus 200 includes no such a function. It may hence be difficult to use the DPD across many models for general purposes. For instance, when the user is to use a plurality of image forming apparatuses 200, the user needs to install a DPD on every image forming apparatus 200.

In the present embodiment below, a description is given of an example where the UPD supports the double-sided printing function and the N-up printing function and only the DPD supports the stapler function, the punching function, and the trimmer function. The UPD and DPD may support other functions as well. For instance, when many different models of the image forming apparatus 200 have a stapler function, the UPD may support the stapler function.

Still referring to FIG. 2, the processing unit 110 in accordance with the present embodiment includes hardware including either one or both of a circuit for processing digital signals and a circuit for processing analog signals. As an example, the hardware may include one or more circuit devices or elements on a circuit board. The one or more circuit devices are, for example, ICs and/or FPGAs (field-programmable gate arrays). The one or more circuit elements are, for example, resistors and/or capacitors.

The installation unit 111 performs a process of installing a UPD in the user terminal 100. The determining unit 112 determines whether or not there is already installed a DPD in the target user terminal 100. If there is already installed a DPD, the presentation unit 113 performs a process of presenting, to the user, the functions that will no longer be available for use if the DPD is uninstalled. The uninstallation unit 114 uninstalls the DPD. The controller 115 controls various units in the user terminal 100. The controller 115, for example, controls reading from, and writing to, the memory 120 and communications by the communications unit 130.

The memory 120 (memory 160) contains instructions that are readable by the computer. The processing unit 110 (processor 150) performs the functions thereof by executing these instructions. Specifically, the processor 150 performs respective processes for the installation unit 111, the determining unit 112, the presentation unit 113, the uninstallation unit 114, and the controller 115 by operating in accordance with the instructions contained in the memory 160. These instructions may be sets of instructions included in programs or instructions for instructing for operation of hardware circuitry in the processor 150.

The UPD installation program 121 contained in the memory 120 is application software for installing a UPD in the user terminal 100. The processing unit 110 provides the installation unit 111, the determining unit 112, the presentation unit 113, and the uninstallation unit 114 by operating in accordance with the UPD installation program 121.

The first DPD 122 contained in the memory 120 is, for example, a DPD for the first image forming apparatus 210. The processing unit 110 causes the first image forming apparatus 210 to print by operating in accordance with the first DPD 122. The second DPD 123 contained in the memory 120 is, for example, a DPD for the second image forming apparatus 220. The processing unit 110 causes the second image forming apparatus 220 to print by operating in accordance with the second DPD 123.

The memory 120 may contain an OS (operating system, not shown) and application software that runs on the OS. The processing unit 110 provides the controller 115 by operating in accordance with the OS and other software.

The programs for providing the processes performed by various units in the processing unit 110 in accordance with the present embodiment may be, for example, stored (contained) in a non-transitory information storage device (information storage medium) that is a computer-readable medium. The information storage device may include, for example, an optical disc, a memory card, a HDD, or a semiconductor memory. The semiconductor memory is, for example, a ROM. The processing unit 110 performs various processes in accordance with the present embodiment based on the programs contained in the information storage device. In other words, the information storage device stores programs for causing the computer to function as various units in the processing unit 110. A computer is an apparatus that includes an input device, a processing unit, a memory, and an output unit. Specifically, a program in accordance with the present embodiment causes the computer to perform the steps that will be described later in detail with reference to, for example, FIGS. 3, 6, and 9 and, in particular, is the UPD installation program 121.

The communications unit 130 performs communications between the user terminal 100 and an external apparatus. As an example, the communications unit 130 transmits information to, and receives information from, the image forming apparatus 200 on the basis of instructions from the processing unit 110 operating in accordance with the UPD, the first DPD 122, or the second DPD 123 installed by the UPD installation program 121. As an example, the communications unit 130 transmits, to the image forming apparatus 200, an image-forming job that is data for printing.

The display unit 140 is for displaying various display screens and includes, for example, a liquid crystal display device or an OLED display device.

The UPD installation program 121 in accordance with the present embodiment is a program for installing a universal printer driver in the image forming apparatus 200 and causes the computer to function as the installation unit 111, the determining unit 112, and the presentation unit 113 shown in FIG. 2.

The technique in accordance with the present embodiment enables the user to recognize, before the DPD is uninstalled, the functions that will no longer be available for use if the DPD is uninstalled. As an example, the user can check the functions that will no longer be available for use to determine, for example, to uninstall the DPD If these functions are not necessary and to leave the DPD intact if the functions are necessary. The technique can thus restrain the necessary DPD from being uninstalled by mistake, thereby reducing the workload of the user such as reinstalling the DPD. Concrete processes will be described later in detail with reference to FIGS. 3 to 11.

The technique in accordance with the present embodiment presents necessary information to the user before the DPD is uninstalled. The following description of the present embodiment therefore assumes that a new UPD is installed when there is already installed a DPD. In a typical situation, the user has been using a given image forming apparatus 200 with a DPD and might need to add a new image forming apparatus 200 to the system.

In the example shown in FIGS. 1 and 2, the first image forming apparatus 210 is available with the first DPD installed, the second image forming apparatus 220 is also available with the second DPD installed, and the third image forming apparatus 230 is newly added to the system. The third image forming apparatus 230 is driven by a UPD. In this situation where a UPD is newly installed over an existing DPD as described above, the technique in accordance with the present embodiment is useful. Note however that the technique in accordance with the present embodiment is broadly applicable in installations of a UPD other than in this particular situation.

2. Details of Processes

Figure 3:
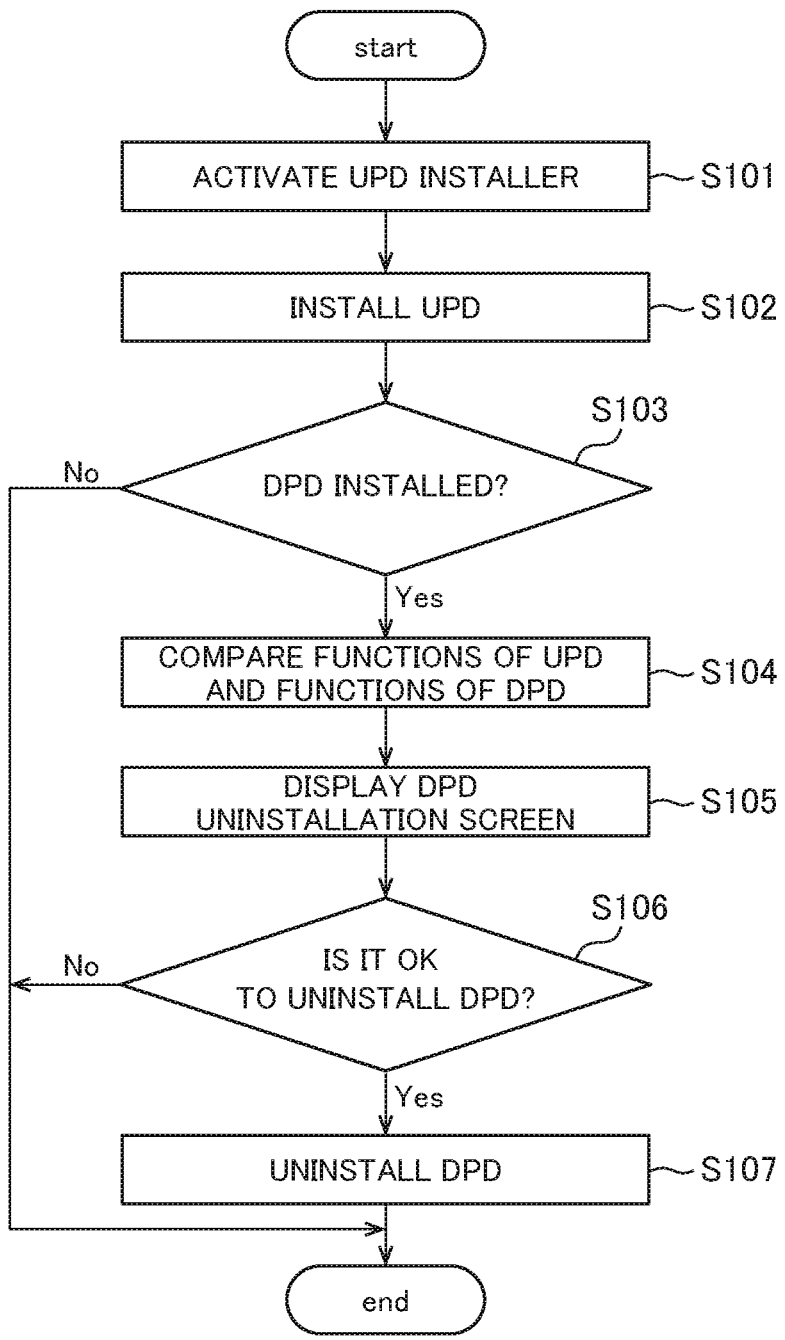
FIG. 3 is a flow chart showing a process in accordance with the present embodiment.

FIG. 3 is a flow chart showing a process in accordance with the present embodiment. A description is given below of an example where it is the processing unit 110 of the user terminal 100 that performs each step. As described above, more specifically, at least some of the steps in FIG. 3 are performed by the processing unit 110 operating in accordance with the Assume, for convenience of description, that there is one or less existing DPD in this example. Assume, for example, a situation where a UPD needs to be installed to start using the third image forming apparatus 230 when the first image forming apparatus 210 is available for use with the first DPD 122 installed.

First of all, in step S101, the processing unit 110 activates the UPD installation program 121 contained in the memory 120. For instance, to newly start using the third image forming apparatus 230 as described above, the processing unit 110 identifies a UPD as a printer driver for operating the third image forming apparatus 230. The processing unit 110 then activates the UPD installation program 121 to install the UPD.

The UPD installation program 121 can be stored in the memory 120 in various manners. As an example, the processing unit 110 may acquire the UPD installation program 121 over the Internet or another public communications network. The UPD installation program 121 may be alternatively delivered on an optical disc such as a CD (compact disc) or a DVD (digital versatile disc) and may be provided in any other form or by any other means.

In step S102, the installation unit 111 in the processing unit 110 performs a process of installing the UPD. For instance, the UPD installation program 121 may include a driver file including data for controlling the image forming apparatus 200 and a setup file including data for a setup. The installation unit 111 installs the UPD by writing the driver file and related data in a prescribed location in the memory 120 in accordance with the setup file.

The determining unit 112, in step S103, determines whether or not there is already installed a DPD in the user terminal 100. For instance, the OS on the user terminal 100 is capable of recognizing the driver software installed in the user terminal 100. Therefore, the determining unit 112 can determine whether or not there is already installed a DPD for the image forming apparatus 200, by acquiring information from the OS. For instance, the determining unit 112 determines whether or not there is already installed a DPD, by searching the installed driver software for driver software with a prescribed name or driver software installed in association with a prescribed device.

More specifically, the determining unit 112 may determine whether or not there is installed a DPD, for the image forming apparatus 200, that can be driven by the UPD installed in step S102. For instance, the determining unit 112 may have, for example, a list of models that can be driven by the UPD or a list of DPDs compatible with the models, to determine the presence/absence of a DPD on the list(s). If the UPD is compatible with all the image forming apparatuses 200 of the same manufacturer, the determining unit 112 may determine whether or not there is installed a DPD that is compatible with the image forming apparatus 200 of the same manufacturer as the manufacturer of the newly added third image forming apparatus 230.

If there is no DPD installed, the processing unit 110 terminates the process shown in FIG. 3. Specifically, no DPD needs to be uninstalled, and no presentation is therefore performed.

If there is a DPD installed, the driver software can be uninstalled by replacing the DPD with a UPD. Assume, as an example, that the first image forming apparatus 210 already exists in the system and also that the determining unit 112 has determined that the first DPD 122, which is a DPD for the first image forming apparatus 210, is already installed. Since the UPD is compatible with the first image forming apparatus 210, the first image forming apparatus 210 can still print if the first DPD 122 is uninstalled.

The UPD only supports functions that are common to multiple models of the image forming apparatus 200 as described above. Therefore, if the UPD is installed and the first DPD 122 is uninstalled, some of the functions might no longer be available.

Accordingly, the presentation unit 113 performs a process of presenting the functions that will no longer be available for use if the DPD is uninstalled. First, in step S104, the presentation unit 113 performs a process of comparing the functions supported by the UPD and the functions supported by the existing DPD, by, for example, acquiring the setting files of the printer drivers.

FIG. 4 shows exemplary setting files of the printer drivers. FIG. 4 shows, as an example, the setting file of the UPD, the setting file of the first DPD 122 compatible with the first image forming apparatus 210, and the setting file of the second DPD 123 compatible with the second image forming apparatus 220. For convenience of description, the setting file of the second DPD 123 is described here along with the other setting files. An example where the second DPD 123 is already installed will be described later in detail with reference to FIG. 11.

Each setting file shown in FIG. 4 is stored in a prescribed location in the memory 120 of the user terminal 100 when the associated printer driver is installed. This prescribed location may vary with, for example, the OS, but is known, so that the determining unit 112 can acquire the setting files shown in FIG. 4 in a suitable manner. Note however that the technique in accordance with the present embodiment does not necessarily involve any specific process that relies on the setting files, so long as the process can compare the functions supported by the UPD and the functions supported by the existing DPD. The technique may alternatively use setting files having a specific data format other than the data format shown in FIG. 4.

The setting file contains information on whether or not the associated printer driver supports functions. For instance, "Support_Double-sided" is a variable representing whether or not the double-sided printing function is supported. "Support_Double-sided=1" indicates that the printer driver supports the double-sided printing function, whereas "Support_Double-sided=0" indicates that the printer driver does not support the double-sided printing function.

"Support_N-up" is a variable representing whether or not the N-up printing function is supported. "Support_Staple" is a variable representing whether or not the stapler function is supported. "Support_Punch" is a variable representing whether or not the punching function is supported. "Support_Trimmer" is a variable representing whether or not the trimmer function is supported. Each variable indicates, for example, that the printer driver supports the associated function when, for example, the value is 1 and does not support the associated function when the value is 0.

In the example shown in FIG. 4, the UPD supports the double-sided printing function and the N-up printing function, but does not support the stapler function, the punching function, and the trimmer function. The first DPD 122 supports the double-sided printing function, the N-up printing function, the stapler function, the punching function, and the trimmer function. The second DPD 123 supports the double-sided printing function, the N-up printing function, the stapler function, and the punching function, but does not support the trimmer function.

In the example shown in FIG. 4, for example, the presentation unit 113 identifies those functions which are supported by the first DPD 122, but not by the UPD, as the functions that will no longer be available for use if the first DPD 122 is uninstalled. In the example shown in FIG. 4, the presentation unit 113 identifies the stapler function, the punching function, and the trimmer function as the functions that will no longer be available for use if the first DPD 122 is uninstalled.

Then, in step S105, the presentation unit 113 presents the functions that will no longer be available for use if the dedicated printer driver is uninstalled, on the basis of a comparison between the functions supported by the dedicated printer driver and the functions supported by the existing the universal printer driver. As an example, the presentation unit 113 presents a DPD uninstallation screen, thereby presenting in advance the negative results of uninstalling the DPD. This capability of providing useful information to the user as to determine whether or not to uninstall the DPD can improve convenience.

Figure 5:
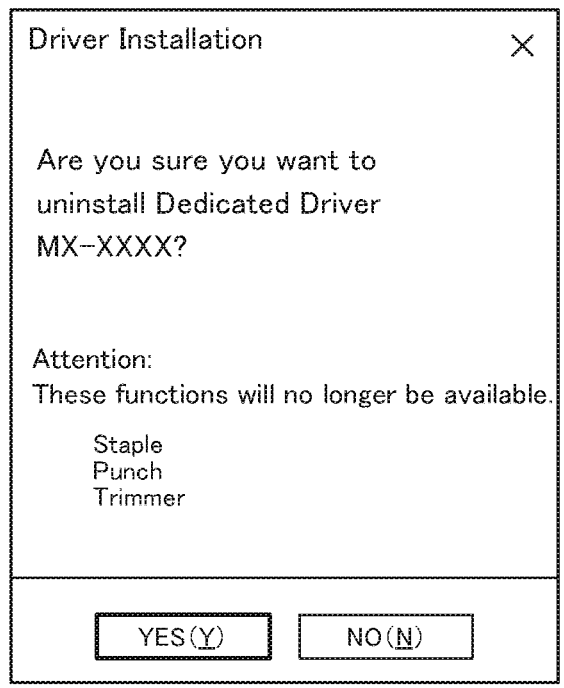
FIG. 5 shows an example of a presented screen.

FIG. 5 is an exemplary uninstallation screen presented in step S105. As an example, the presentation unit 113 performs a process of displaying the screen shown in FIG. 5 on the display unit 140 of the user terminal 100. Alternatively, the presentation unit 113 may perform a process of displaying the screen shown in FIG. 5 on, for example, a smartphone or a wearable connected to the user terminal 100. As another alternative, the presentation unit 113 may perform a presentation process by causing the first image forming apparatus 210 to print the screen shown in FIG. 5 using the first DPD 122. The presentation unit 113 may perform the presentation process in various specific forms including the examples detailed here.

In the example shown in FIG. 5, the presentation unit 113 produces a text display, "Are you sure you want to uninstall Dedicated Driver MX-XXXX?" to inform which DPD is to be uninstalled and prompt the user to accept or reject this confirmation request. MX-XXXX indicates, for example, the name of the first DPD 122. The presentation unit 113, in this example, presents that the stapler function, the punching function, and the trimmer function will no longer be available for use. The user, upon viewing this screen, can determine whether or not to uninstall the DPD in a suitable manner, on the basis of whether or not the stapler function, the punching function, and the trimmer function are needed.

In step S106, the uninstallation unit 114 determines whether or not to uninstall the DPD on the basis of a user input. For instance, when the user selects "Yes" on the screen shown in FIG. 5, the uninstallation unit 114 determines to perform the uninstallation; when the user selects "No," the uninstallation unit 114 determines to not perform the uninstallation.

If the uninstallation unit 114 determines, in step S106, that the DPD is be uninstalled, the uninstallation unit 114 uninstalls the DPD in step S107. In the example given above, the first DPD 122 and related data are deleted from the memory 120, so that the UPD can be used thereafter in controlling the first image forming apparatus 210. For instance, if the stapler and other functions are not necessary, the first image forming apparatus 210 and the third image forming apparatus 230, both controlled through UPD, can deliver sufficient functions.

If the uninstallation unit 114 determines, in step S106, that the DPD is not be uninstalled, the uninstallation unit 114 skips step S107. In the example given above, because the first DPD 122 is not uninstalled, it will be still possible to control the first image forming apparatus 210 using the first DPD 122. Therefore, even after the UPD is installed, the stapler and other functions that are not supported by the UPD are still available for use.

3. Variation Examples

A description is given below of some variation examples.

Processes Based on Log Data

The presentation unit 113 may perform the presentation process on the basis of log data by acquiring the log data for the image-forming job from the image forming apparatus 200, which is a connection responder for the dedicated printer driver. This configuration enables the presentation process to be performed by specifically taking into consideration what types of printing have been done using the DPD. The image forming apparatus 200 in many cases either stores a predetermined volume of log data therein or stores log data for a predetermined period therein. It is therefore easy to acquire log data without having to add a new function to the existing image forming apparatus 200. A description is given below of such a process in a specific manner.

Figure 6:
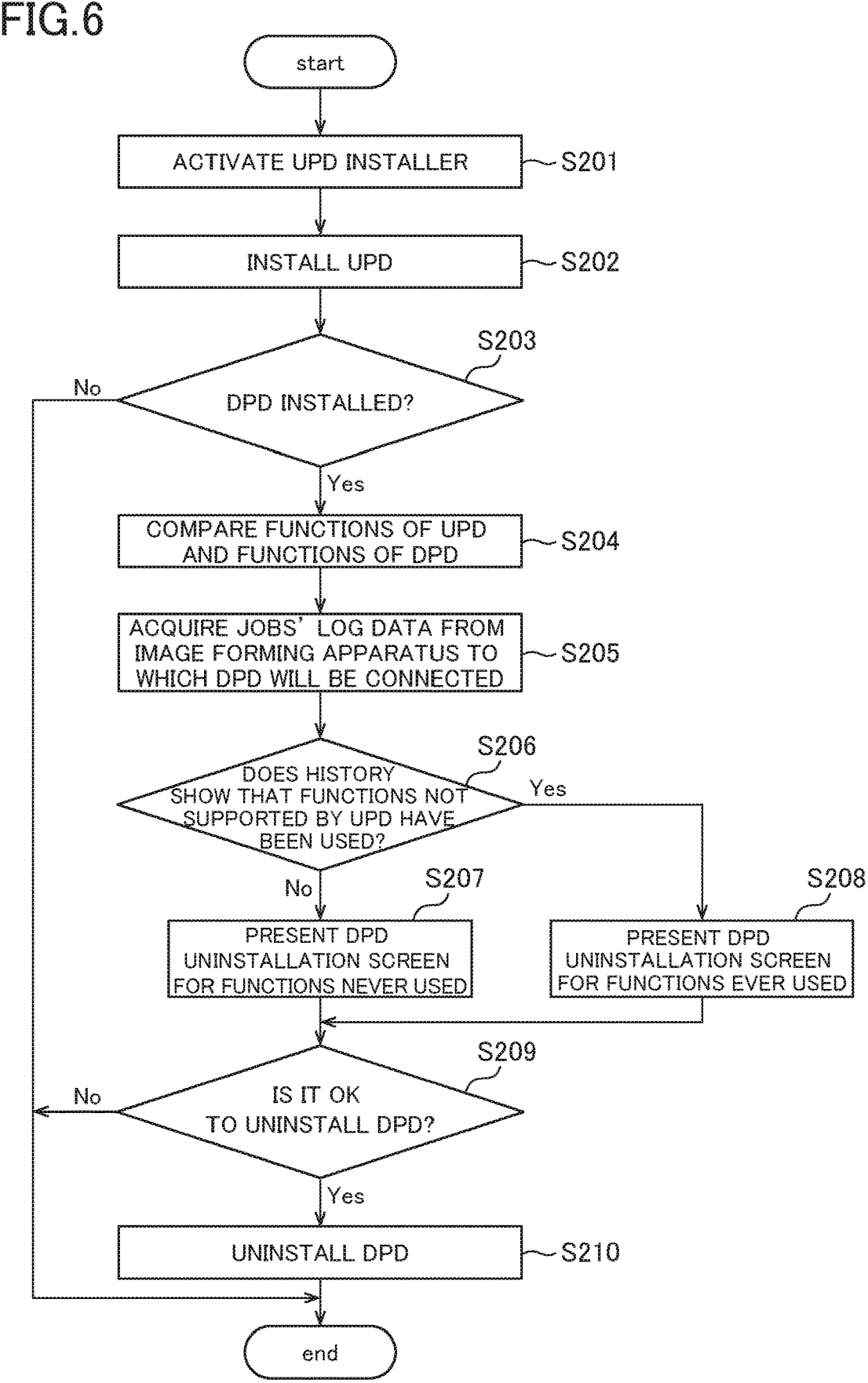
FIG. 6 is a flow chart showing a process in accordance with the present embodiment.

FIG. 6 is a flow chart showing the process. Steps S201 to S204 in FIG. 6 are identical to steps S101 to S104 in FIG. 3, and their detailed description is therefore omitted. By implementing the process up to step S204, for example, the presentation unit 113 determines that the stapler function, the punching function, and the trimmer function will no longer be available for use if the first DPD 122 is uninstalled.

The presentation unit 113, in step S205, acquires log data for the image-forming job from the image forming apparatus 200, which is a connection responder for the target DPD. For instance, the DPD contains connection information for connecting to the associated image forming apparatus 200 in the setting file. The connection information in this example is, for example, the IP (Internet Protocol) address of the image forming apparatus 200, but may be other information. The presentation unit 113 uses this connection information to transmit a fetch command to the image forming apparatus 200, which is a connection responder for the DPD, to acquire log data and receives the log data as a response to this fetch command.

The image-forming job in this example represents data for causing the image forming apparatus 200 to perform a single unit of image-forming process. An image-forming job includes image data for specifying an image to be formed and print setting data. The print setting data includes information representing, for example, the type and size settings for the print medium and color settings (including setting on color or black and white print). The print setting data includes information for specifying the functions to be used. The log data for an image-forming job is a set of time-series data related to the image-forming process performed by the target image forming apparatus 200 and is specifically a set of image-forming jobs.

FIG. 7 is a diagram representing exemplary log data for image-forming jobs. For instance, the image forming apparatus 200 stores information on the print time and day, the sender device, the print target file, and the functions to be used as data for each image-forming job. The log data is not necessarily given in this format and may be prepared in other data formats in which the functions to be used can be identified.

The print time and day is information representing the time and day when a print process was performed based on an image-forming job. The sender device is information for identifying a device that is a sender of an image-forming job and may be the name of the device or information such as the IP address or the MAC address of the device. The print target file is information representing the name of a file from which an image is to be reproduced on a print medium.

The information related to functions to be used is, for example, a value, either 0 or 1, for each entry including the double-sided printing function, the N-up printing function, the stapler function, the punching function, and the trimmer function as shown in FIG. 7.

The example shown in FIG. 7 shows log data for four image-forming jobs that were performed at four times and days t11 to t14. The printing performed at t11 was instructed by a terminal device, "PC1" and used the double-sided printing function d the stapler function, but not the N-up printing function, the punching function, and the trimmer function. A similar description applies to each of the other image-forming jobs. One can determine whether or not a function was used, depending on whether the value in the corresponding entry is 0 or 1.

The presentation unit 113 determines in step S206 whether or not the history shows that there is a function ever used that is not supported by the UPD.

As an example, assume that the presentation unit 113 has determined that the stapler function, the punching function, and the trimmer function will no longer be available for use if the first DPD 122 is uninstalled as described earlier, Under this assumption, if the log data acquired from the first image forming apparatus 210 contains any data represented by the value 1 in the entry associated with the stapler function, the presentation unit 113 determines that the history shows that the stapler function has ever been used. On the other hand, if the values are 0 in all the entries associated with the stapler function, the presentation unit 113 determines that there is no history that shows any previous use of the stapler function. A similar description applies to the punching function and the trimmer function. In the example shown in FIG. 7, the presentation unit 113 determines that the history shows that the stapler function and the punching function have been previously used, whereas the trimmer function has never been used.

One image forming apparatus 200 might be used by two or more terminal devices. The process implemented in the present embodiment uninstalls the DPD from one of the user terminals 100 and does not affect the DPD installed in the other terminal device(s). Taking this into consideration, the usage history in this example may be the history of usage by the user terminal 100 that executes the UPD installation program 121. For instance, the presentation unit 113 may extract log data related to an image-forming job transmitted from the target user terminal 100 as log data for the image-forming job. For instance, the presentation unit 113 extracts log data for the image-forming job transmitted from the user terminal 100 on the basis of the information on the sender device.

If there is no history indicating previous use of a function not supported by the UPD, the presentation unit 113, in step S207, performs a process of presenting those DPD functions which are not supported by the UPD as the functions that will no longer be available for use if the DPD is uninstalled.

For instance, the presentation unit 113 presents a screen similar to the one shown in FIG. 5.

If the history shows any previous use of a function not supported by the UPD, the presentation unit 113, in step S208, may present a different screen. Specifically, the presentation unit 113 presents, to the user, those functions which are supported by the dedicated printer driver, but not by the universal printer driver, and which are shown in the history as having ever been used by the user as the functions that will no longer be available for use if the dedicated printer driver is uninstalled, on the basis of the log data. For instance, in the example above, the presentation unit 113 presents the stapler function and the punching function as the functions that will no longer be available for use if the DPD is uninstalled. In this example, the trimmer function may not be included in the presentation.

A function that shows up in the usage history is estimated to be more likely to be used in the future than a function that does not show up in the usage history. In the example above, the stapler function and the punching function, among others, are more likely to be continuously used after the UPD is installed than the trimmer function. Therefore, if the DPD is uninstalled, the DPD might have to be reinstalled to use these functions. In this respect, the present embodiment produces a display indicating that the stapler function and the punching function, among others, will no longer be available for use, so that the user can appropriately determine whether or not to uninstall the DPD. On the other hand, a function that does not show up in the usage history is unlikely to be used in the future and therefore has a low priority in the presentation to the user.

Alternatively, the presentation unit 113 performs a presentation process to present the functions that will no longer be available for use if the dedicated printer driver is uninstalled, on the basis of a comparison between the functions supported by the dedicated printer driver and the functions supported by the existing the universal printer driver. In this presentation process, the presentation unit 113 may present the functions that will no longer be available for use if the dedicated printer driver is uninstalled in such a format that the user can distinguish between the functions that show up in the user's usage history and the functions that do not show up in the user's usage history.

Figure 8:
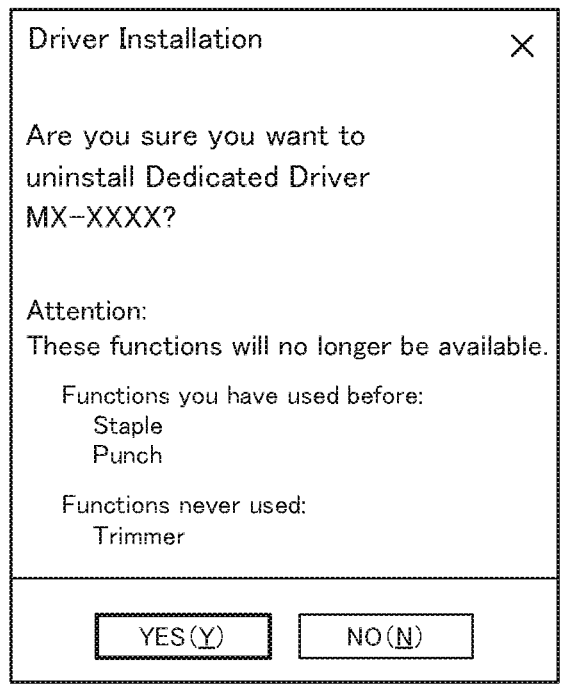
FIG. 8 shows an example of a presented screen.

FIG. 8 is an exemplary uninstallation screen presented in such a situation. For instance, the presentation unit 113 performs a process of displaying the screen shown in FIG. 8 on the display unit 140 of the user terminal 100. The presentation process may be implemented in various other forms.

In the example shown in FIG. 8, the presentation unit 113 produces a display indicating that the stapler function, the punching function, and the trimmer function will no longer be available for use. The stapler function and the punching function are indicated as showing up in the usage history, whereas the trimmer function is indicated as missing from the usage history. FIG. 8 shows, as an example, a presentation where text is used to indicate whether or not a function shows up in the usage history, which is not the only possibility. For instance, the presentation unit 113 may display the functions that show up in the usage history in a more recognizable form than the functions that do not show up in the usage history. For instance, the presentation unit 113 creates different levels of recognizability by changing text size, color, and/or layout.

This particular configuration enables presenting functions supported by the DPD, but not by the UPD, in different formats depending on whether the functions show up in the usage history, thereby presenting more useful information to the user in determining whether or not to uninstall the DPD.

The presentation in step S207 or S208 is followed by the same process as in the example shown in FIG. 5. In step S209, the uninstallation unit 114 determines whether or not to uninstall the DPD on the basis of a user input. If the uninstallation unit 114 determines that the DPD is to be uninstalled, the uninstallation unit 114 uninstall the DPD in step S210. If the uninstallation unit 114 determines that the DPD is not to be uninstalled, the uninstallation unit 114 skips step S210.

Alternatively, the presentation unit 113 may acquire log data stored in the user terminal 100 by the dedicated printer driver for image-forming jobs, to perform a presentation process on the basis of the acquired log data. Since the image-forming jobs are data transmitted from the user terminal 100 to the image forming apparatus 200 as described earlier, the log data is available for use if the log data is stored in the user terminal 100. This particular approach is advantageous in that the user terminal 100 does not need to communicate with the image forming apparatus 200 to acquire log data.

Figure 9:
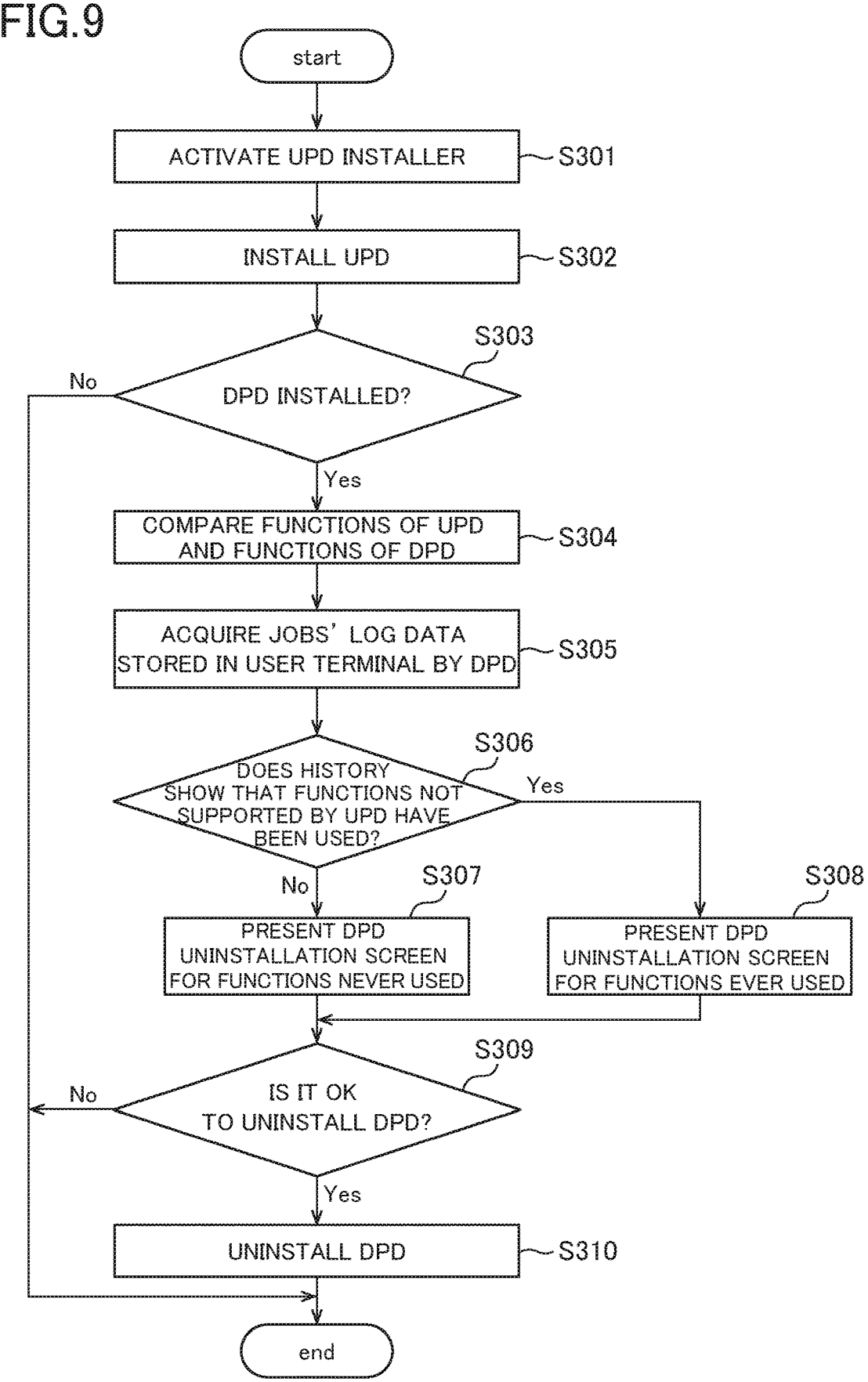
FIG. 9 is a flow chart showing a process in accordance with the present embodiment.

FIG. 9 is a flow chart showing a process in this situation. FIG. 9 is the same as FIG. 6, except that log data is acquired from the memory 120 in the user terminal 100 in step S305 in FIG. 9, and detailed description is omitted.

FIG. 10 is exemplary log data stored in the user terminal 100 by the DPD. In comparison with FIG. 7, the information related to a sender device is fixed to represent the user terminal 100 and therefore may be omitted. The log data stored in the user terminal 100 however may contain information that enables identifying a sender device. FIG. 10 shows an example where the log data contains information that enables identifying the image forming apparatus 200 (destination). For instance, the log data stored by the first DPD 122 contains, in an associated entry, identification information that enables identifying the first image forming apparatus 210. The log data may not contain information that enables identifying the image forming apparatus 200 (destination). The log data can be given in various formats as demonstrated here.

The log data in such a case contains information that enables identifying functions ever used as shown in FIG. 10. It is hence possible to make an appropriate decision on the usage history of functions that will no longer be available for use if the DPD is uninstalled.

Exemplary Screen for Multiple DPDs

In some cases, the determining unit 112 might determine that a plurality of dedicated printer drivers has been installed in the user terminal 100, the plurality of dedicated printer drivers including a first dedicated printer driver (first DPD 122) that connects to the first image forming apparatus 210 and a second dedicated printer driver (second DPD 123) that connects to the second image foaming apparatus 220.

In such cases, the presentation unit 113 may perform a process of presenting, to the user, functions in such a format that the user can distinguish between the functions that will no longer be available for use if the first dedicated printer driver is uninstalled and the functions that will no longer be available for use if the second dedicated printer driver is uninstalled.

Specifically, the processing unit 110 performs step S104 and onwards shown in FIG. 3, step S204 and onwards shown in FIG. 6, or step S304 and onwards shown in FIG. 9 on all the plurality of installed. DPDs.

Assume, as an example, that the steps shown in FIG. 3 are to be performed and that the UPD, the first DPD 122, and the second DPD support the functions shown in FIG. 4. Under this assumption, the presentation unit 113 determines that the stapler function, the punching function, and the trimmer function will no longer be available for use if the first DPD 122 is uninstalled. The presentation unit 113 determines that the stapler function and the punching function will no longer be available for use if the second DPD 123 is uninstalled.

FIG. 11 is an example of a screen presented in such a situation. In this example, a presentation is made indicating that the stapler function, the punching function, and the trimmer function will no longer be available for use if the DPD named "MX-XXXX" is uninstalled and also that the stapler function and the punching function will no longer be available for use if the DPD named "MX-YYYY" is uninstalled. For instance, the first DPD 122 is an equivalent of MX-XXXX, and the second DPD 123 is an equivalent of MX-YYYY. The presentation unit 113 may display the two screens shown in FIG. 11 next to each other, sequentially, or in pop-up form. FIG. 11 shows an example where by using two screens, functions are displayed in such a format that the user can distinguish between the functions that will no longer be available for use if the first DPD 122 is uninstalled and the functions that will no longer be available for use if the second DPD 123 is uninstalled, which is not the only possibility. For instance, the presentation unit 113 may display functions on one screen in such a format that the user can distinguish between the functions that will no longer be available for use if the first DPD 122 is uninstalled and the functions that will no longer be available for use if the second DPD 123 is uninstalled, by changing, for example, the size, color, and/or layout of the text or like means that represents these functions. The text or like means in this example may include image information such as icons.

This particular approach enables explicitly presenting the negative results of uninstalling each DPD to the user, thereby enabling the user to determine in an appropriate manner whether or not to uninstall the DPD. For instance, the user can flexibly and easily determine to uninstall some of the DPDs and leaving the others intact.

The technique in accordance with the present embodiment is applicable to the installation method in which the steps shown in, for example, FIGS. 3, 6, and 9 are performed. The installation method includes: a step of installing a universal printer driver for the image forming apparatus 200 in the user terminal 100 for use by the user (e.g., step S102); a step of determining whether or not there is installed a dedicated printer driver in the user terminal 100 (e.g., step S103); and upon determining that there is installed a dedicated printer driver in the user terminal 100, a step of performing a presentation process of presenting to the user the functions that will no longer be available for use if the dedicated printer driver is uninstalled (e.g., step 105).

The present embodiment has been discussed in detail. A person skilled in the art will readily appreciate that numerous modifications can be made without substantially departing from the new matter and effects of the present embodiment. Accordingly, all such modifications are included in the scope of the present disclosure. For example, terms that appear at least once in the description or drawings along with other broader or synonymous terms can be replaced by those other terms in any part of the description or drawings. Also, all the combinations of the present embodiment and the modifications are encompassed in the scope of the present disclosure. Also, the configurations and operations of the user terminal and the image forming apparatus, among others, are not limited to those described in the present embodiment, and various modifications can be made.

What is claimed is:

1. An installation method comprising:
installing a universal printer driver for an image forming apparatus in a user terminal for use by a user;
determining whether or not a dedicated printer driver is installed in the user terminal;
upon determining that the dedicated printer driver is installed in the user terminal, performing a presentation process of presenting to the user a function that will no longer be available for use if the dedicated printer driver is uninstalled before uninstalling the dedicated printer driver; and
uninstalling the dedicated printer driver when a user input permitting the uninstallation of the dedicated printer driver is received in response to the presentation process.

2. The installation method according to claim 1, further comprising acquiring log data for an image-forming job from the image forming apparatus to which the dedicated printer driver will be connected, to perform the presentation process based on the log data.

3. The installation method according to claim 1, further comprising acquiring log data stored in the user terminal by the dedicated printer driver for an image-forming job, to perform the presentation process based on the log data.

4. The installation method according to claim 2, wherein, in the presentation process, a function that is supported by the dedicated printer driver, but not by the universal printer driver, and that shows up in a history as having been used by the user the function is presented to the user based on the log data as the function that will no longer be available for use if the dedicated printer driver is uninstalled.

5. The installation method according to claim 3, wherein, in the presentation process, a function that is supported by the dedicated printer driver, but not by the universal printer driver, and that shows up in a history as having been used by the user, the function is presented to the user based on the log data as the function that will no longer be available for use if the dedicated printer driver is uninstalled.

6. The installation method according to claim 4, wherein in the presentation process of presenting the function that will no longer be available for use if the dedicated printer driver is uninstalled, the presentation process is performed based on a comparison between a function supported by the dedicated printer driver and a function supported by the universal printer driver, and
in the presentation process, the function that will no longer be available for use if the dedicated printer driver is uninstalled is presented in such a format that the user can distinguish between a function that shows up in the history as having been used by the user and a function that shows up in no history as having been used by the user.

7. The installation method according to claim 5, wherein the presentation process of presenting the function that will no longer be available for use if the dedicated printer driver is uninstalled, the presentation process is performed based on a comparison between a function supported by the dedicated printer driver and a function supported by the universal printer driver, and
in the presentation process, the function that will no longer be available for use if the dedicated printer driver is presented in such a format that the user can distinguish between a function that shows up in the history as having been used by the user and a function that shows up in no history as having been used by the user.

8. The installation method according to claim 1, wherein, in the presentation process, the function that will no longer be available for use if the dedicated printer driver is uninstalled is presented based on a comparison between a function supported by the dedicated printer driver and a function supported by the universal printer driver.

9. The installation method according to claim 1, wherein if it is determined that a plurality of dedicated printer drivers is installed in the user terminal, and the plurality of dedicated printer drivers includes a first dedicated printer driver that connects to a first image forming apparatus and a second dedicated printer driver that connects to a second image forming apparatus, the presentation process is performed in such a format that the user can distinguish between a function that will no longer be available for use if the first dedicated printer driver is uninstalled and a function that will no longer be available for use if the second dedicated printer driver is uninstalled.

10. A non-transitory computer-readable storage medium storing an installation program for a universal printer driver for an image forming apparatus, the installation program causing a computer to perform operations comprising:

installing the universal printer driver in a user terminal for use by a user;

determining whether or not a dedicated printer driver is installed in the user terminal;

upon determining that a dedicated printer driver is installed in the user terminal, performing a presentation process of presenting to the user a function that will no longer be available for use if the dedicated printer driver is uninstalled before uninstalling the dedicated printer driver; and uninstalling the dedicated printer driver when a user input permitting the uninstallation of the dedicated printer driver is received in response to the presentation process.

* * * * *